US010341828B1

(12) United States Patent
Bein

(10) Patent No.: US 10,341,828 B1
(45) Date of Patent: Jul. 2, 2019

(54) GFI TRIPPED-CIRCUIT DETECTION AND NOTIFICATION SYSTEM

(71) Applicant: George P. Bein, Sedona, AZ (US)

(72) Inventor: George P. Bein, Sedona, AZ (US)

( * ) Notice: Subject to any disclaimer, the term of this patent is extended or adjusted under 35 U.S.C. 154(b) by 0 days.

(21) Appl. No.: 16/235,208

(22) Filed: Dec. 28, 2018

Related U.S. Application Data

(63) Continuation of application No. 15/859,441, filed on Dec. 30, 2017.

(51) Int. Cl.
| G08B 13/24 | (2006.01) |
| H04W 4/20 | (2018.01) |
| H02H 1/00 | (2006.01) |
| H04L 12/58 | (2006.01) |
| H02H 3/16 | (2006.01) |
| H04W 4/14 | (2009.01) |
| H04M 3/02 | (2006.01) |

(52) U.S. Cl.
CPC ............ *H04W 4/20* (2013.01); *H02H 1/0007* (2013.01); *H02H 3/16* (2013.01); *H04L 51/24* (2013.01); *H04M 3/02* (2013.01); *H04W 4/14* (2013.01)

(58) Field of Classification Search
CPC .......... G08B 17/06; G08B 21/00; G02H 3/16; H04W 4/20
USPC ................. 340/551, 650, 652, 664
See application file for complete search history.

(56) References Cited

U.S. PATENT DOCUMENTS

| 7,292,898 B2 | 11/2007 | Clark | |
| 2005/0093708 A1* | 5/2005 | Dupeire | H02G 1/00 340/664 |
| 2015/0077243 A1* | 3/2015 | Hooper | H02H 3/16 340/532 |

OTHER PUBLICATIONS

Non-Final Office Action in the U.S. Appl. No. 15/859,441 dated May 31, 2018.
Non-Complaint Office Action in the U.S. Appl. No. 15/895,441 dated Dec. 11, 2018.

* cited by examiner

*Primary Examiner* — Toan N Pham
(74) *Attorney, Agent, or Firm* — Snell & Wilmer L.L.P.

(57) ABSTRACT

A device is disclosed for plugging into a standard wall outlet that is protected by a Ground Fault Circuit Interrupter (GFCI) and for facilitating detection of a GFCI trip using a door/window sensor of a security system. The device comprises: a plug, the plug configured to plug into an outlet, wherein the outlet is protected by the GFCI; and an electromagnet. The electromagnet is powered by the outlet when the plug is plugged into the outlet. The electromagnet is automatically powered off when the GFCI trips. The electromagnet is configured to be located proximate the window/door sensor of the security system for detecting when the electromagnet is powered off. The window/door sensor is configured to signal an absence of an electromagnetic field near the window/door sensor.

19 Claims, 3 Drawing Sheets

GFI TRIPPED-CIRCUIT DETECTION AND NOTIFICATION SYSTEM

CROSS-REFERENCE TO RELATED APPLICATIONS

This application is a continuation of U.S. application Ser. No. 15/859,441 entitled "GFI TRIPPED-CIRCUIT DETECTION AND NOTIFICATION SYSTEM" filed on Dec. 30, 2017. The aforementioned application is incorporated herein by reference in its entirety for all purposes.

BACKGROUND

Currently, when a GFI circuit is tripped, there are no remote notifications to the homeowner. Usually, in garages where GFI circuits are required, homeowners have freezers or refrigerators. There are also places where there are GFI circuits where a homeowner may have an aquarium. If the GFI circuit becomes tripped and the homeowner is not aware of it, there can be the loss of hundreds of dollars of food that becomes thawed or spoiled or heated aquariums become cold and prized fish can die. This disclosure perfectly solves this problem.

BRIEF SUMMARY

The present disclosure uses an electromagnet to replace the fixed magnet in door and window sensors used by home/office security systems. When the GFI circuit is tripped, the security system detects an "open" condition and sends pre-programmed notifications to the homeowner or other designated party.

OBJECT

The object of the disclosure is to detect when a GFI circuit is tripped and to immediately alert the homeowner or other designated person whether they are in the vicinity or if they are thousands of miles away, saving the homeowner from possible disastrous consequences.

DETAILED DESCRIPTION

GFI Tripped-Circuit Detection and Notification System:

GFI means Ground Fault Interrupter, also known as GFCI (Ground Fault Circuit Interrupter). Building codes in most states now require that GFI outlets be installed in "wet" locations such as kitchens, baths, laundry rooms, garages, or any place there is danger from moisture-related electrical shock. A GFI has its own built-in circuit breaker that can sense an electrical imbalance, or fault, and instantaneously shut off power at the outlet to prevent user shock or a short circuit.

In many cases, homeowners may have refrigerators, freezers and/or aquariums plugged into outlets that are on GFI circuits. If the GFI gets tripped and the homeowner is not home and is not alerted to that problem for a great length of time, there can be a great loss of money due to the thawing of frozen food, the spoilage of food or the death of pet fish. These are just some examples. This is the problem that is solved by this disclosure!

Motivation for the Problem to be Solved:

The extension cord for the refrigerator in my garage ran on the ground behind the soft water system's salt water tank. It was plugged into a GFI circuit. The tank sprung a leak causing a short in the refrigerator extension cord. This immediately caused the GFI circuit in the garage to be tripped. On that same GFI circuit in the garage is a freezer stocked full with frozen foods. Had my wife not been home to notice that the light was off in the refrigerator (and the freezer), we would have lost hundreds of dollars-worth of food. This disclosure solves this problem!

Manner of Making and Using

Figure 1:
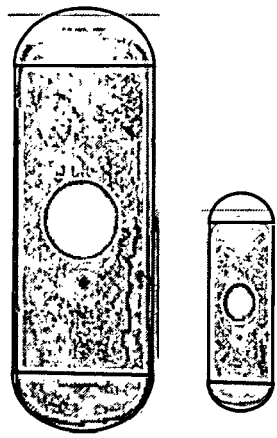
FIG. 1—Typical door or window security system sensors. Left side is a sending unit coupled to a typical internet-based security system. Right side is a fixed magnet.

This disclosure utilizes parts of existing home (or office) security systems that are currently available from several companies. Typically, to monitor whether a door or window is open or closed, a small fixed magnet is placed near a larger sending unit. FIG. 1 shows a standard door or window open/closed detection device with a fixed magnet. This sensor is coupled or paired with a base station generally connected to the internet. As the fixed magnet is separated away from the sending unit when a door or window is opened, the sending unit wirelessly sends a signal to the base station which then implements previously set up notification instructions.

Figure 2:
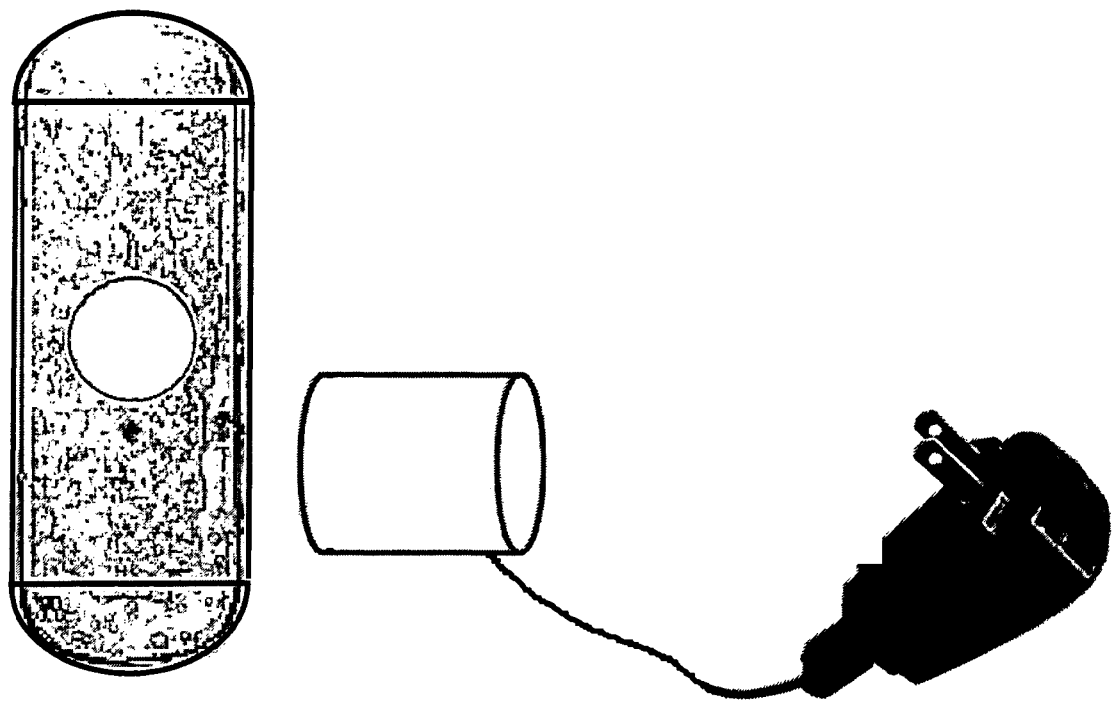
FIG. 2—The GFI Tripped-Circuit System replaces the fixed magnet with an approximately 12-VDC electromagnet.

This disclosure replaces the small fixed magnet with an electromagnet which plugs into the GFI circuit outlet. FIG. 2 shows a 110-volt-powered electromagnet replacing the fixed magnet. When the GFI circuit is tripped, the electromagnet loses its magnetic force and the associated sending unit "thinks" that there has been a separation or an "opening". Then, immediately, all of the notifications that have been set up will be activated.

Such notifications include SMS messaging to a cell phone, sending an email, making a local announcement by the base station and, most importantly, calling one's cell phone anywhere where a 10-digit cell phone number will work, such as anywhere in the US, Canada and Mexico.

So, if a homeowner is on a 2-week vacation and is notified of a tripped GFI, he or she can call a trusted person to investigate the problem at their home, to reset the GFI, or, at least, plug critical appliances into live AC outlets.

Figure 3:
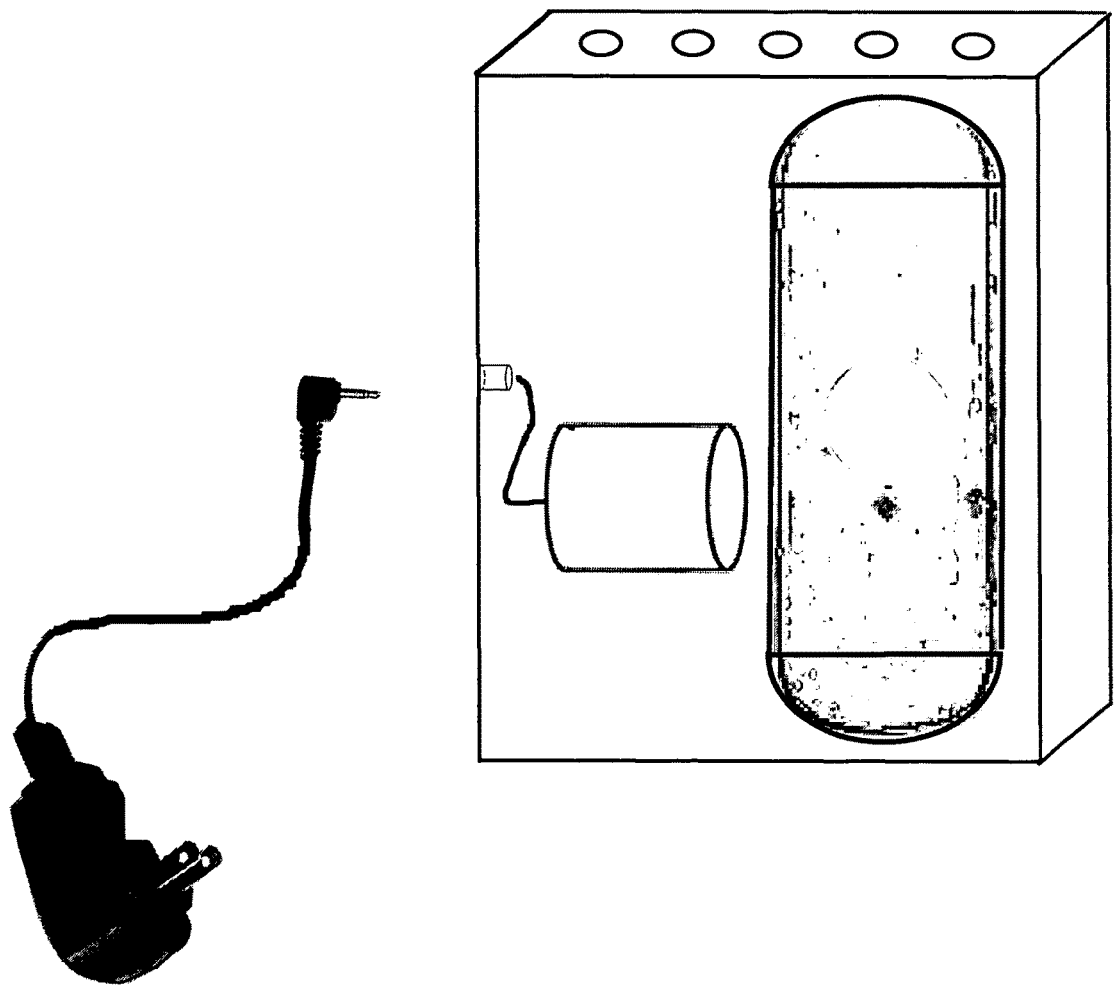
FIG. 3—One possible configuration utilizing an approximately 12-VDC electromagnet powered by a 110-VAC input with an approximately 6-VDC output transformer.

Relationship Between the Components:

The Wireless Sending Device and the low-voltage electromagnet, typically 12 volts DC, could be manufactured to fit into a relatively small container box. FIG. 3 shows a typical implementation of the present disclosure. The electromagnet is placed close enough to the sending unit so that, when energized and a magnetic force is produced, the sending unit "thinks" that the overall sensor is in a "closed" position. Although there is virtually no heat generated because the plug-in transformer is approximately 6 volts DC output, the container box could have ventilation holes on the top and elsewhere.

The transformer has a plug at one end that plugs into the electromagnet at the container box. And this is the crucial part: The transformer itself plugs into any GFI outlet that someone wants to monitor and to receive notifications if tripped.

How to Use:

The setup of the hereof is described in the preceding section. Once plugged into the GFI circuit to be protected, the home security system will perform the tasks necessary to monitor the circuit and to notify the homeowner if that GFI circuit is tripped. I have a working prototype, GFI Tripped-Circuit Detection and Notification System, in my garage.

Figure 4:
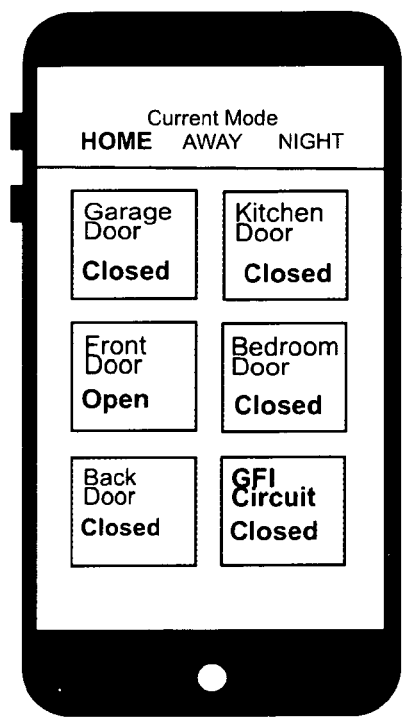
FIG. 4—Typical "dashboard" of a home security system.

For example, FIG. 4 shows a typical "dashboard" for a home security system. In this example, which is my own home, the dashboard is showing the "Front Door" as being "Open". But, most importantly, please note the bottom right icon labeled as "GFI circuit". That is also being shown as "Closed".

That means that the GFI circuit in my garage is working fine. That means that my refrigerator and freezer that are plugged into outlets on that circuit are not in any danger of having the food inside being spoiled.

I would be able to see this dashboard from anywhere in the country using my I-phone or I-pad or other wireless device capable of receiving a cell phone call.

Figure 5:
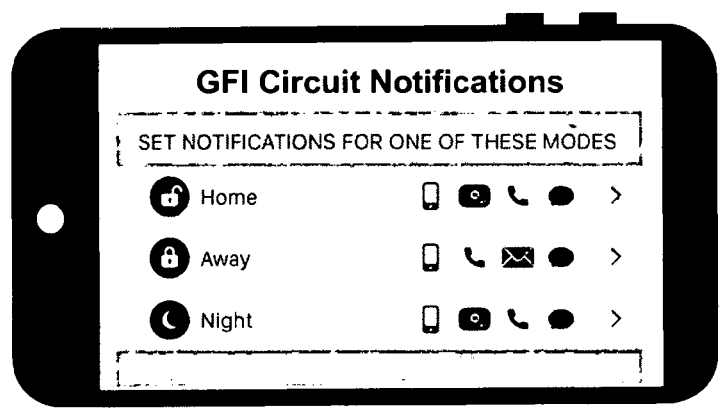
FIG. 5—Possible notifications that could occur should the GFI circuit be tripped.

But, what would happen if the GFI circuit got tripped? FIG. 5 shows example notifications which could be activated should the GFI circuit be tripped. Whether in the Home, Away or Night mode, every one of those notifications would be immediately activated. Those icons in FIG. 5 represent sending an SMS message to my cell phone, sending an email, making an announcement at my security base station and, most importantly, calling my cell phone. So, I could be anywhere where a 10-digit cell phone number would be completed.

If I were 2,000 miles away, for example, and received a notification that my GFI circuit was tripped, I would call my trusty handyman who has access to my house to go over to check things out. He can either reset the GFI or plug my freezer and refrigerator into a live AC outlet in the house. A trusted family member or neighbor could be called to perform this task.

The present disclosure will work with currently available home or office security systems to monitor GFI circuits and to send notifications by several methods to designated parties if the GFI circuit becomes tripped.

My disclosure provides a definite way to detect when a GFI circuit is tripped and then to immediately notify a designated person by up to 4 different ways including a cell phone call. Therefore, the person can be at a location far from the place where the GFI circuit has been tripped.

There is nothing on the market available today that instantly notifies someone by cell phone or SMS message or email of a tripped GFI circuit by working through a home security system. There are hundreds of home security systems available on the market today that could easily implement my disclosure.

A GFI Tripped-Circuit Detection and Notification System has been disclosed.

Building codes in most states now require that GFI outlets be installed in "wet" locations such as kitchens, baths, laundry rooms and garages.

In many cases, homeowners may have refrigerators, freezers and/or aquariums plugged into outlets that are on GFI circuits. If the GFI gets tripped and the homeowner is not home and is not alerted to that problem for a great length of time, there can be a great loss of money due to the thawing of frozen food, the spoilage of food or the death of pet fish. These are just some examples. This is the problem that is solved!

This disclosure solves this problem by replacing the fixed magnet used by door and window sensors of a home security system with an electromagnet. The electromagnet is plugged into the GFI circuit to be monitored.

When the GFI circuit is tripped, the electromagnet loses is magnetism and its associated sending unit reports an "open" event to the base unit of the home security system. The system then instantly responds by sending out pre-programmed notifications such an SMS message, an email, a local voice announcement and, most importantly, calls a designated cell phone number.

Therefore, the person called who is being notified about the tripped GPS can be thousands of miles away from the site of the tripped GPS. The person can immediately take measures to rectify the problem like notifying a family member or other trusted person to go to the home to check things out. If necessary, a freezer or refrigerator or aquarium could be plugged into a live AC outlet.

What is claimed is:

1. A device for plugging into a standard wall outlet that is protected by a Ground Fault Circuit Interrupter (GFCI) and for facilitating detection of a GFCI trip using a door/window sensor of a security system, the device comprising:
   a plug, the plug configured to plug into an outlet, wherein the outlet is protected by the GFCI;
   an electromagnet, the electromagnet powered by the outlet when the plug is plugged into the outlet, and wherein the electromagnet is automatically powered off when the GFCI trips, the electromagnet configured to be located proximate the window/door sensor of the security system for detecting when the electromagnet is powered off, wherein the window/door sensor is configured to signal an absence of an electromagnetic field near the window/door sensor.

2. The device of claim 1, wherein the window/door sensor was originally configured to detect a presence or absence of a fixed magnet in the security system, and wherein the fixed magnet is replaced by the electromagnet.

3. The device of claim 1, wherein the device is configured to detect the GFCI trip by detecting the absence of an electromagnetic field due to a power loss to the electromagnet.

4. The device of claim 3, wherein the device is configured to be used to trigger a notification in the security system, and wherein the security system is a home/office security system that typically bases notifications on a separation of the window/door sensor from a fixed magnet.

5. The device of claim 1, further comprising a transformer for converting an outlet power from 110 V AC to 6 V DC voltage.

6. The device of claim 1, further comprising a transformer for converting an outlet power from alternating current power to direct current power.

7. The device of claim 1, wherein the GFCI trip simulates opening of a window/door causing the security system to implement previously set up notification instructions comprising one or more of: SMS messages to a cell phone, an email alert, a local announcement, a notification to a security company monitoring service, and a phone call to the cell phone.

8. A method of retrofitting an existing security system to report loss of power on a Ground Fault Circuit Interrupter (GFCI), wherein the existing security system comprises a door/window sensor having a sensor and a fixed magnet, the method comprising:

replacing the fixed magnet in the existing security system's door/window sensor with an electromagnet that is powered from a plug;

plugging the plug into an outlet protected by the GFCI, wherein a GFCI trip causes the outlet to lose power, simulates a door/window opening, and causes the existing security system to send a notification.

9. The method of claim 8, further comprising converting, with a transformer, the outlet power from alternating current power to direct current power.

10. The method of claim 8, detecting the loss of power to the outlet upon an occurrence of the GFCI trip and causing the existing security system to send the notification based upon the detecting of the loss of power.

11. The method of claim 10, wherein the notification is sent using the same system for notifying of an open window or an open door, without reprogramming the existing security system.

12. The system of claim 11, further comprising a transformer for converting the outlet power from alternating current power to direct current power.

13. The system of claim 11, wherein the GFCI trip simulates opening of a window/door causing the security system to implement previously set up notification instructions comprising one or more of: SMS messages to a cell phone, an email alert, a local announcement, a notification to a security company monitoring service, and a phone call to the cell phone.

14. The method of claim 8, the method further comprising the security system implementing previously set up notification instructions comprising one or more of: SMS messages to a cell phone, an email alert, a local announcement, a notification to a security company monitoring service, and a phone call to the cell phone.

15. The method of claim 8, further comprising detecting the GFCI trip by detecting an absence of an electromagnetic field due to a power loss to the electromagnet.

16. The method of claim 8, further comprising triggering the notification in the existing security system, and wherein the existing security system is a home/office security system that typically bases notifications on a separation of the window/door sensor from the fixed magnet in a door or window detector.

17. A system for detecting loss of power in a Ground Fault Circuit Interrupter (GFCI), the system comprising:

a security system comprising a magnetic field sensor; and a device for plugging into a standard wall outlet that is electrically connected to the Ground Fault Circuit Interrupter (GFCI) for detection of a trip by the GFCI, the device comprising:

a plug, the plug configured to plug into an outlet, wherein the outlet is protected by the GFCI; and an electromagnet, the electromagnet powered from the outlet when the plug is plugged into the outlet, and wherein the electromagnet is automatically powered off when the GFCI trips, the electromagnet located proximate the magnetic field sensor;

the magnetic field sensor for detecting when the electromagnet is powered off.

18. The system of claim 17, wherein the magnetic field sensor was originally configured to detect a presence or absence of a fixed magnet in the security system door or window, and wherein the fixed magnet is replaced by the electromagnet.

19. The system of claim 17, wherein the system is configured to detect the tripping of the GFCI by detecting a power loss to the electromagnet, and to trigger a notification in a standard home/office security system that bases notifications on a separation of the magnetic field sensor from a fixed magnet in a door or window.

\* \* \* \* \*